United States Patent
Cho et al.

(10) Patent No.: US 8,505,059 B2
(45) Date of Patent: Aug. 6, 2013

(54) CHANNEL CAPACITY ESTIMATION AND PREDICTION METHOD AND APPARATUS FOR RATE ADAPTIVE WIRELESS VIDEO

(75) Inventors: Yong-Ju Cho, Seoul (KR); Jeong-Ju Yoo, Daejeon (KR); Jin-Woo Hong, Daejeon (KR); Hayder Radha, East Lansing, MI (US); Shirish Krande, East Lansing, MI (US); Kiran Misra, East Lansing, MI (US)

(73) Assignees: Electronics and Telecommunications Research Institute, Daejeon (KR); Michigan State University, East Lansing, MI (US)

( * ) Notice: Subject to any disclaimer, the term of this patent is extended or adjusted under 35 U.S.C. 154(b) by 964 days.

(21) Appl. No.: 12/344,228

(22) Filed: Dec. 25, 2008

(65) Prior Publication Data
US 2009/0196343 A1    Aug. 6, 2009

(30) Foreign Application Priority Data
Dec. 27, 2007    (KR) .................. 10-2007-0139188

(51) Int. Cl.
*H04N 7/173*    (2011.01)
*H04N 7/12*    (2006.01)

(52) U.S. Cl.
USPC . 725/114; 725/105; 375/240.03; 375/240.07; 375/240.26; 375/240.27; 375/240.25

(58) Field of Classification Search
USPC .......... 725/81, 105, 114, 123; 375/225–227, 375/358, 240.02–240.07, 240.25–240.27; 370/912–914
See application file for complete search history.

(56) References Cited

U.S. PATENT DOCUMENTS

| | | | | |
|---|---|---|---|---|
| 5,323,421 | A * | 6/1994 | LaRosa et al. | 375/224 |
| 7,784,076 | B2 * | 8/2010 | Demircin et al. | 725/81 |
| 2001/0018770 | A1 * | 8/2001 | Eryurtlu et al. | 725/91 |
| 2003/0101387 | A1 * | 5/2003 | Lee | 714/704 |
| 2005/0259770 | A1 * | 11/2005 | Chen | 375/346 |
| 2006/0072490 | A1 * | 4/2006 | McLaughlin et al. | 370/328 |
| 2006/0291591 | A1 * | 12/2006 | Ghosh | 375/340 |
| 2007/0009011 | A1 * | 1/2007 | Coulson | 375/144 |
| 2008/0025204 | A1 * | 1/2008 | Radha et al. | 370/216 |
| 2008/0232459 | A1 * | 9/2008 | Auyeung | 375/240.01 |
| 2009/0116589 | A1 * | 5/2009 | Zhang et al. | 375/341 |

FOREIGN PATENT DOCUMENTS
KR    1020020093464 A    12/2002

OTHER PUBLICATIONS

Yongju Cho et al., "On Channel Capacity Estimation and Prediction for Rate Adaptive Wireless Video," IEEE Transactions on Multimedia, Nov. 2008, vol. 10, Issue 7.
Lay Teen Ong et al., "Joint SNR Target and Rate Adaptation Based on Bit Error Rate Estimation," IEEE, 2005, pp. 470-474.
International Search Report for PCT/KR2008/007754 filed on Dec. 29, 2008.

* cited by examiner

*Primary Examiner* — Chris Parry
*Assistant Examiner* — Gigi L Dubasky

(57) ABSTRACT

There is provided a channel capacity estimation method for adaptive video transmission, the method including: estimating a Bit Error Rate (BER) for a received video packet; and estimating channel capacity by using the estimated BER.

14 Claims, 12 Drawing Sheets

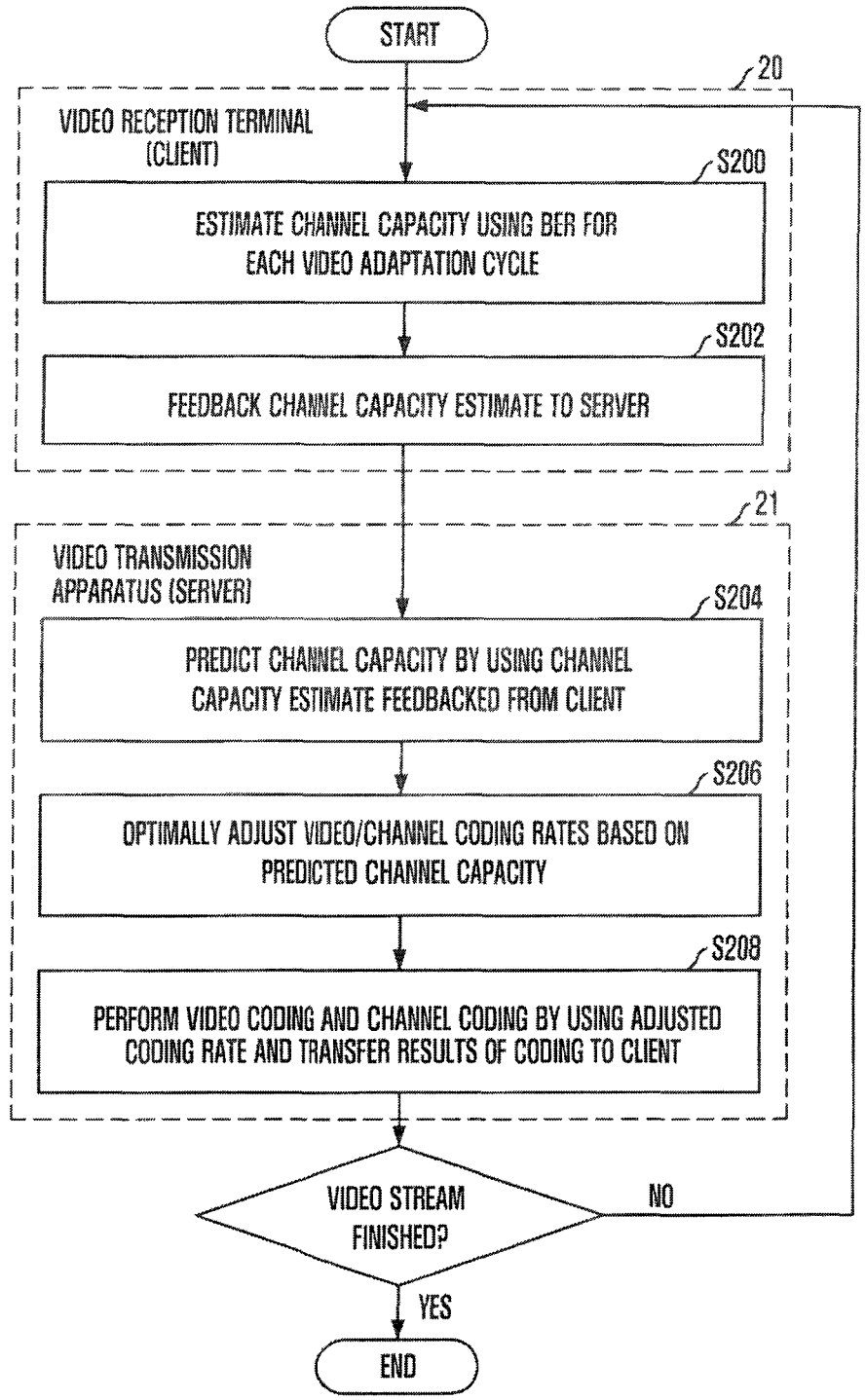

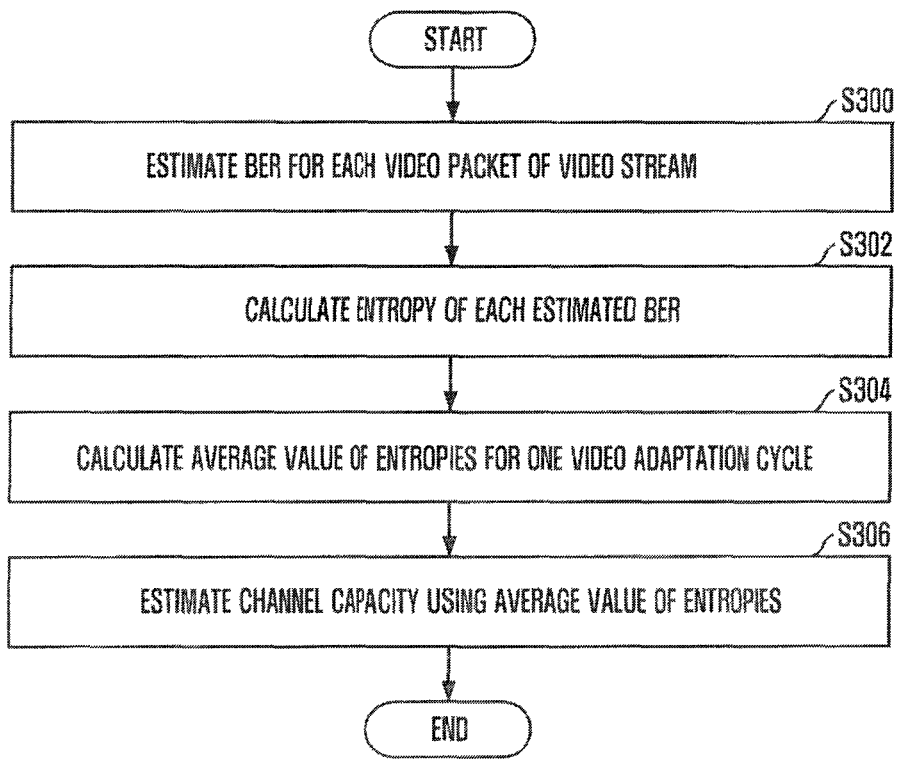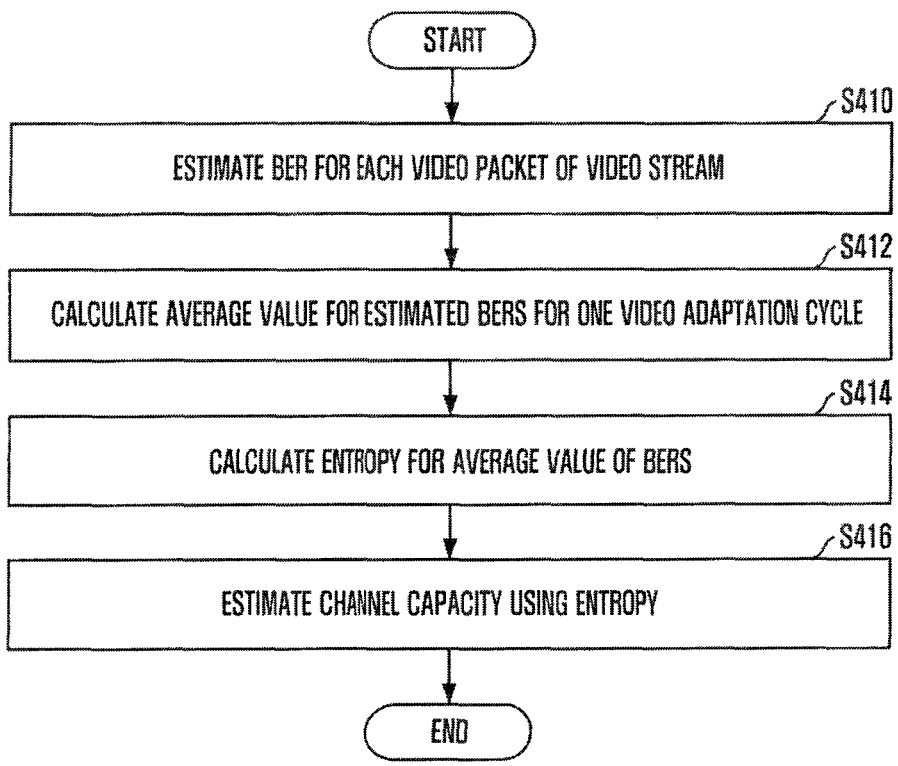

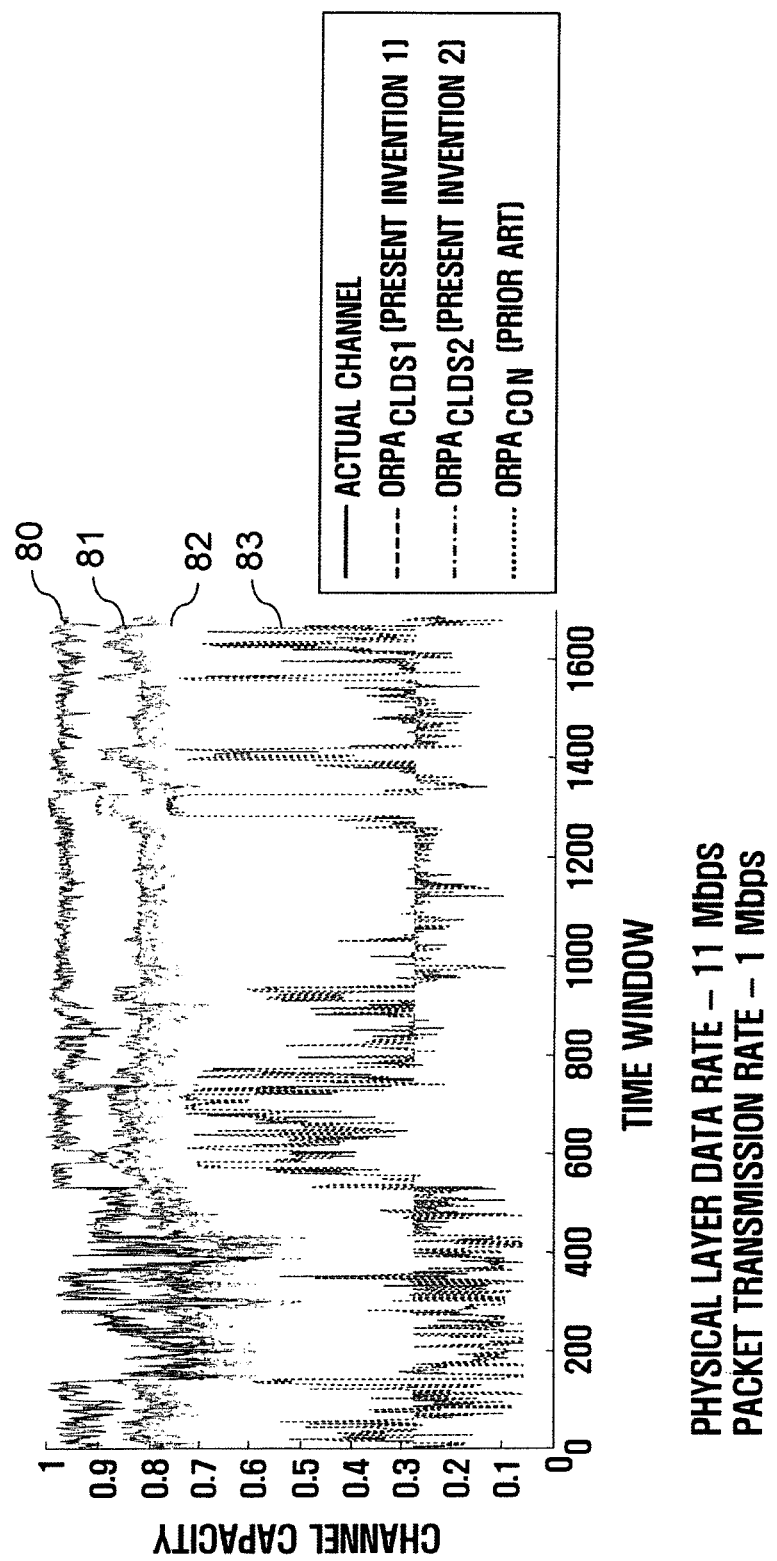

CHANNEL CAPACITY ESTIMATION AND PREDICTION METHOD AND APPARATUS FOR RATE ADAPTIVE WIRELESS VIDEO

BACKGROUND OF THE INVENTION

1. Field of the Invention

The present invention relates to channel capacity estimation and prediction for rate adaptive wireless video; and, more particularly, to channel capacity estimation and coding rate adjustment method for adaptive video transmission, and video transmission/reception apparatus using the same, which can increase coding rate adaptation by precise channel capacity prediction to improve the quality of wireless video, by optimally adjusting, at a video transmission apparatus (server), video/channel coding rates based on a channel capacity estimate, which is estimated by using Bit Error Rate (BER) of a received packet and then feedbacked by a video reception apparatus (client).

This work was supported by the IT R&D program of MIC/IITA [2006-S-103-02, "Development of Ubiquitous Content Access Technology for Convergence of Broadcasting and Communications"].

2. Description of Related Art

In radio environments, lots of bit errors may occur due to weak signal strength, which result in loss of packets. Therefore, in order to decrease this packet loss in a radio terminal, it is required to estimate link quality or channel status. In particular, for real-time video adaptation, it is necessary to precisely estimate radio channel capacity in real time. This is because link quality is seriously affected by interference, fading, multi-path effects, mobility, and so on, which causes a severe change in channel capacity.

One of prior arts for estimating link quality or channel status is a radio LAN protocol (Conventional protocol: "CON protocol") which discards packets having one or more residual error (MAC layer error). This protocol estimates link quality (channel capacity) by using Packet Error Rate (PER), as in the following equation:

$$\tilde{C}_n^{CON} = 1 - \frac{1}{m}\sum_{i=1}^{m} Z_i = 1 - PER \quad \text{Eq. (1)}$$

wherein $Z_i$ denotes a checksum ($Z_i=1$ if checksum fails) and PER represents a packet error rate.

However, since this prior art method predicts link quality or channel capacity by using PER, not BER, the accuracy of such prediction is lowed to decrease channel adaption, thereby making it impossible to guarantee the desired quality of wireless video.

Meanwhile, as attempts to reduce packet loss in a radio terminal, lots of studies on Cross-Layer Design (CLD) protocol have actively been made in recent years. As well-known in the art, the CLD protocol refers to a technology that transfers packets with bit errors to an upper layer for utilizing them therein.

The fact that many studies to date can increase video throughput through the use of CLD was verified. Moreover, it was also verified that the existing radio LAN can utilize side information, which is important information capable of estimating channel status. Here, the side information contains Signal to Silence Ratio (SSR) (where SSR corresponds to SNR parameter) and checksum.

In addition to the perception about the importance of such side information, the CLD protocol utilizing side information, that is, Cross-Layer Design with Side Information (CLDS) protocol has appeared. This CLDS protocol can be applied very usefully to real-time video rate-adaptation. Especially, it is expected that the link quality based on CLDS will be estimated more precisely by using the entropy of residual error process.

SUMMARY OF THE INVENTION

An embodiment of the present invention is directed to providing an apparatus for increasing coding rate adaptation by precise channel capacity prediction to improve the quality of wireless video, by optimally adjusting, at a video transmission apparatus (server), video/channel coding rates based on a channel capacity estimate, which is estimated by using Bit Error Rate (BER) of a received packet and then feedbacked by a video reception apparatus (client).

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

In accordance with the present invention, there is provided a channel capacity estimation method for adaptive video transmission, the method including: estimating a Bit Error Rate (BER) for a received video packet; and estimating channel capacity by using the estimated BER.

In accordance with the present invention, there is provided a coding rate adjustment method for adaptive video transmission, the method including: predicting channel capacity estimate feedbacked from a video reception apparatus as channel capacity of a next channel interval; and adjusting a video coding rate and a channel coding rate within the predicted channel capacity.

In accordance with the present invention, there is provided a video reception apparatus for adaptive video transmission, the apparatus including: a channel capacity estimator for estimating a Bit Error Bit Rate (BER) of a received video packet by using channel status side information and estimating channel capacity by using the estimated BER to feedback the estimated channel capacity to a video transmission apparatus; and a decoding unit for channel-decoding a received video stream based on the channel status side information and video-decoding the channel-decoded video stream to recover an original video stream.

In accordance with the present invention, there is provided a video transmission apparatus for adaptive video transmission, the apparatus including: an encoding unit for performing video and channel encoding depending on a predetermined video coding rate and a channel coding rate to generate a video stream; and a coding rate adjustor for adjusting the video coding rate and the channel coding rate within the permissible rage of channel capacity estimate feedbacked from a video reception apparatus.

The present invention proposes an optimal channel capacity estimation/prediction technology based on CLDS protocol and an optimal rate (video coding rate and channel coding rate) adjustment technology using the estimated/predicted channel capacity, and thus enables effective video adaptation/conversion in radio environments. Details of this will be given below.

Firstly, a channel capacity estimation method executed in a video reception terminal in accordance with the present invention first estimates BER($\epsilon$) based on channel status side information (e.g., checksum and SSR) of packets transmitted through a network. Next, it estimates a residual error entropy by using BER(ε) and then estimates channel capacity depending on the estimated residual error entropy.

Secondly, an optimal coding rate adjustment method executed in a video transmission apparatus (server) in accordance with the present invention finds the best video coding rate and channel coding rate by using 'probability distribution of channel capacity prediction error' and 'Rate Distortion (RD) model of video sequence' based on the channel capacity estimate obtained by the video reception terminal.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

BRIEF DESCRIPTION OF THE DRAWINGS

FIG. 2 is a flowchart for explaining channel capacity estimation and coding rate adjustment methods for adaptive video transmission in accordance with another preferred embodiment of the present invention.

FIGS. 3 and 4 are flowcharts for explaining an optimal channel capacity estimation method executed in the video reception terminal (client) shown in FIG. 1, in accordance with another preferred embodiment of the present invention.

FIGS. 8 to 13 are views describing the comparison of channel capacity predictions relative to variations of physical layer data rate.

DESCRIPTION OF SPECIFIC EMBODIMENTS

The advantages, features and aspects of the invention will become apparent from the following description of the embodiments with reference to the accompanying drawings, which is set forth hereinafter, and thus, the present invention will easily be carried out by those skilled in the art. Further, in the following description, well-known arts will not be described in detail if they could obscure the invention in unnecessary detail. Hereinafter, preferred embodiments of the present invention will be described in detail with reference to the accompanying drawings.

Figure 1:
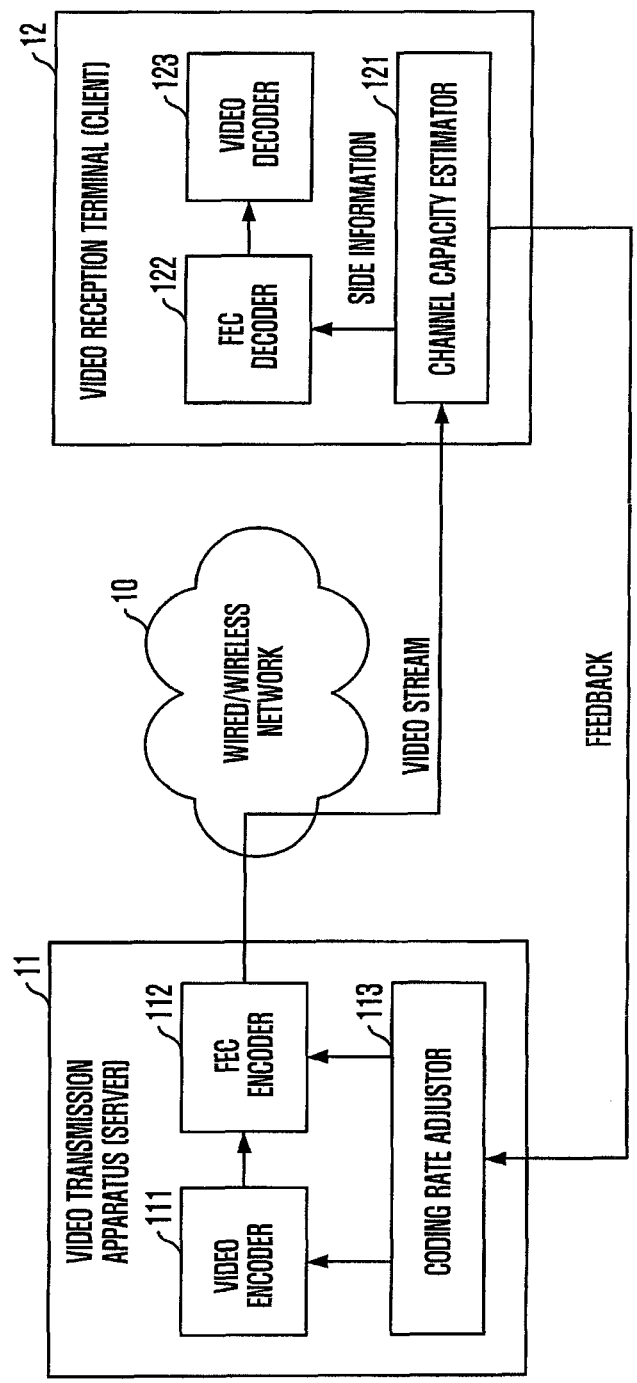
FIG. 1 is a block diagram showing the configuration of a video service system for adaptive video transmission in accordance with a preferred embodiment of the present invention.

FIG. 1 is a block diagram showing the configuration of a video service system for adaptive video transmission in accordance with a preferred embodiment of the present invention.

The video service system of the present invention, as shown in FIG. 1, includes a video transmission apparatus (server) 11 and a video reception terminal or video reception apparatus (client) 12. In these apparatuses, when the video reception apparatus 12 estimates channel capacity and performs feedback transmission thereon, the video transmission apparatus 11 optimally adjusts a video coding rate and a channel coding rate based on the channel capacity estimate.

More specifically, the video reception terminal 12 of the present invention is provided with a channel capacity estimator 121, a Forward Error Correction (FEC) decoder 122, and a video decoder 123, each of which will be described below.

The channel capacitor estimator 121 acquires channel status side information (e.g., SSR and checksum) from a video stream received through a wired or wireless network 10 and estimates BER for each received video packet on the basis of the acquired channel status side information. Thereafter, it estimates channel capacity depending on the estimated BER and then feedbacks it to the video transmission apparatus 11. This will be described in more detail with reference to FIGS. 3 and 4.

The FEC decoder 122, which is a kind of channel coders for correcting channel errors, channel-decodes a received video stream by using the channel status side information provided from the channel capacity estimator 121. Then, the video decoder 123 decodes the channel-decoded video stream for recovering an original video stream.

Meanwhile, the video transmission apparatus 11 is provided with a video encoder 111, an FEC encoder 112, a coding rate adjustor 113, each of which will be described in detail below.

The vide encoder 111 encodes video data at a given video coding rate, and the FEC encoder 112 is a kind of channel encoders for correcting channel errors and performs channel encoding on the result of encoding in the video encoder 111 at a given channel coding rate. A video stream is generated by these two encoders 111 and 112.

The coding rate adjustor 113 optimally adjusts the video coding rate of the video encoder 111 and the channel coding rate of the FEC encoder 112 within the permissible rage of the channel capacity estimate feedbacked from the video reception terminal 12. This will be discussed in more detail with reference to a process 21 of FIG. 2 and FIG. 5.

FIG. 2 is a flowchart for explaining channel capacity estimation and coding rate adjustment methods for adaptive video transmission in accordance with another preferred embodiment of the present invention, in which the entire process executed in the video service system of FIG. 1 is shown.

The video reception terminal 12 performs a process 20 of estimating optimal channel capacity. To be more specific, channel capacity is estimated by using BER per video adaptation cycle at step S200, and thereafter, the channel capacity estimate is feedbacked to the video transmission apparatus 11 at step S202.

Then, the video transmission apparatus 11 carries out a process 21 of optimally adjusting a coding rate by using the channel capacity estimate feedbacked from the video reception terminal 12. That is, the video transmission apparatus 11 predicts channel capacity of a next channel cycle by using the channel capacity estimate feedbacked from the video reception terminal 12 at step S204, and then optimally tunes video/channel coding rates based on the predicted channel capacity at step S206. Next, it performs video coding and channel coding by using the tuned coding rate for video data, and transmits the result to the video reception terminal 12 at step S208.

The above processes 20 and 21 are repeatedly performed until the last of the bit stream, thereby implementing a channel adaptive video service.

FIGS. 3 and 4 are flowcharts for explaining an optimal channel capacity estimation method executed in the video reception terminal shown in FIG. 1, in accordance with another embodiment of the present invention.

Table 1 below shows variations of (1) average PER, (2) BERs of all packets (including both packets with errors and without errors), and BERs of packets with errors, relative to variations of SSR value at 11 Mbps.

TABLE 1

| SSR (dB) | Average PER | BER of all packets | BER of packets with errors |
| --- | --- | --- | --- |
| 5 | 0.701 | 0.0253 | 0.0361 |
| 13 | 0.6248 | 0.0157 | 0.0251 |
| 20 | 0.2166 | 0.0048 | 0.0223 |
| 26 | 0.0384 | 0.0023 | 0.0591 |

BER of channel is varied depending on 'SSR' representing link quality of channel shown in Table 1, but has nonlinear relationship between them. Therefore, the present invention adopts a Binary Symmetric Channel (BSC) model to estimate BER corresponding to SSR of each video packet (see Table 1). In particular, 'BER relative to SSR' given in Table 1 should be continuously updated for each packet.

In addition, 'checksum' can also be used to identify whether or not there is any error of bits in a packet. If there exists any error in a packet, BER (which may be average crossover probability) corresponding to SSR of this packet can be estimated.

Meanwhile, the channel capacity estimation method in accordance with the present invention includes two methods, which will be described in detail below with reference to FIGS. 3 and 4.

The first method is a method that obtains BER for each packet and then estimates channel capacity $CLDS_1$ by using an average value of entropies (instantaneous entropies) of each BER, as shown in FIG. 3. The second method obtains BER for each packet and then estimates channel capacity $CLDS_2$ by using an entropy of an average value of BERs, as shown in FIG. 4.

First of all, the first estimation method will be discussed with reference to FIG. 3 and Eq. (2) given below.

At step S300, the channel capacity estimator 121 included in the video reception terminal 12 of FIG. 1 estimates $BER(\tilde{\epsilon}_i)$ based on channel status side information (e.g., SSR and checksum) for each video packet of a video stream received through the network 10.

Next, the channel capacity estimator 121 derives an entropy $H_b(\tilde{\epsilon}_i)$ for each estimated BER at step S302.

Thereafter, the channel capacity estimator 121 calculates an average value of entropies for one video adaptation cycle at step S304, and then estimates channel capacity by using the average value of entropies at step S306.

The first channel capacity estimation method as discussed above can be represented as follows:

$$\tilde{C}_n^{CLDS_1} = 1 - \frac{1}{m}\sum_{i=1}^{m} H_b(\tilde{\epsilon}_i) \qquad \text{Eq. (2)}$$

wherein, $\tilde{\epsilon}_i$ denotes a BER estimate for an i-th packet and $H_b(\tilde{\epsilon}_i)$ represents an instantaneous entropy for each packet. Further, one video adaptation cycle includes an m-number of packets, and was set to about 5 seconds in simulation.

Next, the second estimation method will be explained with reference to FIG. 4 and Eq. (3).

At step S410, the channel capacity estimator 121 of the video reception terminal 12 estimates $BER(\tilde{\epsilon}_i)$ based on channel status side information (e.g., SSR and checksum) for each video packet of a video stream received through the network 10.

Next, the channel capacity estimator 121 calculates an average value of the estimated BERs for one video adaptation cycle at step S412.

Subsequently, the channel capacity estimator 121 derives an entropy for the average value of BERs at step S414 and then estimates channel capacity by using the entropy at step S416.

The second channel capacity estimation method as described above can be expressed as:

$$\tilde{C}_n^{CLDS_2} = 1 - H_b\left(\frac{1}{m}\sum_{i=1}^{m} \tilde{\epsilon}_i\right) \qquad \text{Eq. (3)}$$

Figure 5:
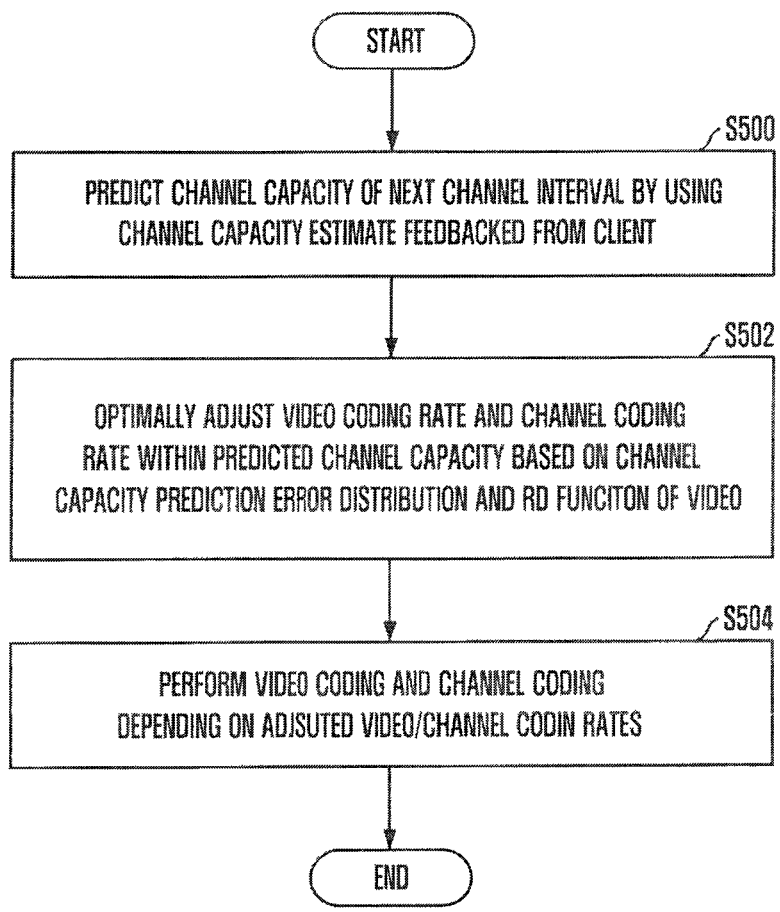
FIG. 5 is a flowchart for explaining an optimal coding rate adjustment method executed in the video transmission apparatus (server) shown in FIG. 1, in accordance with another preferred embodiment of the present invention.

FIG. 5 is a flowchart for explaining an optimal coding rate adjustment method executed in the video transmission apparatus shown in FIG. 1, in accordance with another preferred embodiment of the present invention. Here, the coding rate includes a video coding rate and a channel coding rate.

First of all, the channel capacity rate prediction method executed in the video transmission apparatus 11 (more correctly, the coding rate adjustor 113) will be described below.

In the preferred embodiment of the present invention, the channel capacity estimate $\tilde{C}_n$, which is estimated and provided by the video reception terminal 12 for a current channel interval (which corresponds to a video adaptation cycle in the video reception terminal and is assumed to be about 5 seconds), is utilized as a channel capacity estimate $\hat{C}_{n+1}$ of a 'next channel interval' at step S500.

This method is not lowered in performance compared with the existing estimation methods, rather it is simple and can reduce the load of the server 11. Accordingly, the channel capacity estimation (for a next 5 seconds interval) is calculated as:

$$\hat{C}_{n+1} = \tilde{C}_n \qquad \text{Eq. (4)}$$

wherein $\tilde{C}_n$ denotes a channel capacity estimate (estimate feedbacked from the video reception terminal) for a current channel interval and $\hat{C}_{n+1}$ represents a channel capacity estimate for a next channel interval.

Now, the optimal coding rate adjustment method executed in the coding rate adjustor 113 will be described in detail.

In general, the result of channel capacity prediction is very similar to actual channel capacity, but there always exist prediction errors. Especially, in case a larger value than the actual channel capacity is predicted and utilized, almost all packets of an interval at which channel capacity is predicted may be lost. In other words, the channel capacity rate prediction value approximates the actual channel capacity, but should be not greater than the actual channel capacity. By doing so, the best channel utilization is possible.

At step S502, the present invention optimally adjusts a video coding rate and a channel coding rate based on the distribution (having Gaussian distribution) of channel capacity prediction error and a Rate Distortion (RD) function Q(E) within the channel capacity predicted at step S500.

That is, an optimal video coding rate $\dot{R}_n$ for a next channel interval has a value that Peak Signal to Noise Ratio (PSNR) of a video in transmission can be optimized for the channel interval. Here, the video coding rate $\dot{R}_n$ plus the channel coding rate $R_n$ equals 1. For example, when a video is transmitted at 500 kbps, if a current channel capacity rate is 0.8, the video should be encoded at 400 kbps and the remainder thereof should be channel-coded and then transmitted for optimal channel utilization.

In other words, if the channel coding rate $R_n$ gets smaller, the probability that channel capacity prediction value is greater than the actual channel capacity value gets lower, but an RD function value gets smaller and thus the total PSNR value gets lower. On the contrary, if the channel coding rate $R_n$ gets greater, an RD function value gets greater, but the probability that channel capacity prediction value is greater than the actual channel capacity gets higher. Thus, there is a high possibility that the total PSNR will be a minimum value.

Therefore, Eq. (5) below is less than the channel capacity prediction value, but makes it possible to find a channel capacity rate having the best PSNR value. That is, in the rate adjustment of the present invention, it is characterized by adjusting the video coding rate and the channel coding rate to have the best video quality within the predicted channel capacity (see Eq. (4)) by using the channel capacity prediction error distribution (see FIG. 6) and the video RD function (see FIG. 7).

$$R_n^* = \arg\max_{R_n(0 \leq R_n)} Q(R_n T) \int_{R_n}^{\infty} \frac{1}{\sqrt{2\pi}\,\sigma_e} \exp\left(\frac{-(x_n - \hat{C}_n)^2}{2\sigma_e^2}\right) dx +$$

$$Q'((R_n - \hat{C}_n)T) \int_{-\infty}^{R_n} \frac{1}{\sqrt{2\pi}\,\sigma_e} \exp\left(\frac{-(x_n - \hat{C}_n)^2}{2\sigma_e^2}\right) dx$$

$$= \arg\max_{R_n(0 \leq R_n \leq 1)} Q(R_n T) \frac{\int_{R_n - \hat{C}_n}^{1 - \hat{C}_n} \frac{1}{\sqrt{2\pi}\,\sigma_e} \exp\left(\frac{-e_n^2}{2\sigma_e^2}\right) de}{\int_{-\hat{C}_n}^{1-\hat{C}_n} \frac{1}{\sqrt{2\pi}\,\sigma_e} \exp\left(\frac{-e_n^2}{2\sigma_e^2}\right) de} +$$

$$Q'((R_n - \hat{C}_n)T) \frac{\int_{-\hat{C}_n}^{R_n - \hat{C}_n} \frac{1}{\sqrt{2\pi}\,\sigma_e} \exp\left(\frac{-e_n^2}{2\sigma_e^2}\right) de}{\int_{-\hat{C}_n}^{1-\hat{C}_n} \frac{1}{\sqrt{2\pi}\,\sigma_e} \exp\left(\frac{-e_n^2}{2\sigma_e^2}\right) de}$$

Eq. (5)

wherein $Q(\cdot)$ represents an RD function of a video sequence, $Q'(\cdot)$ denotes a distortion function of a video sequence, and $e_n$ denotes a channel prediction error and is defined as follows: $e_n = \hat{C}_n - \hat{C}_{n-1}$. Further, since the distortion function $Q'(\cdot)$ of a video sequence is nearly "0", it may be negligible. In Eq. (5), T denotes a packet transmit rate.

Meanwhile, the video transmission apparatus 11 performs video coding and channel coding depending on the video coding rate and channel coding rate optimally adjusted as above at step S504.

Figure 6:
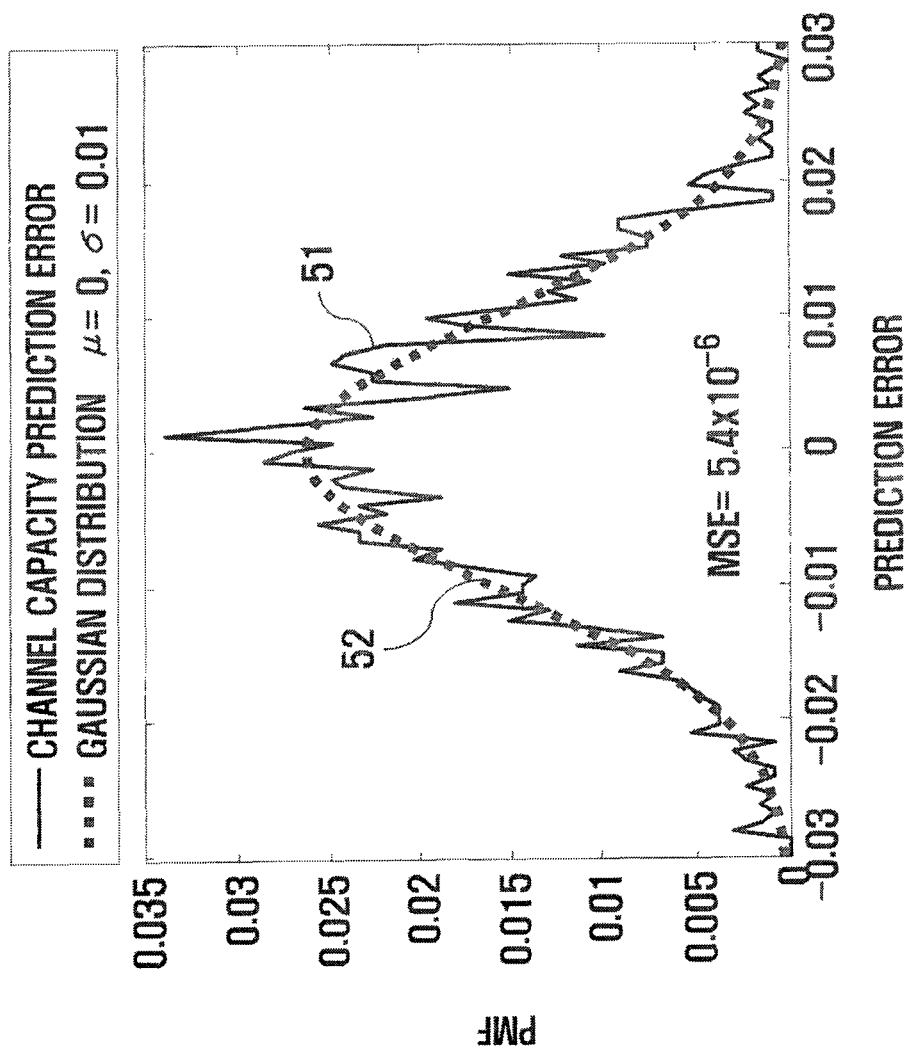
FIG. 6 is a view showing channel capacity prediction error distribution applied to the present invention.

FIG. 6 is a view showing channel capacity prediction error distribution applied to the present invention. From FIG. 6, it can be seen that the channel capacity prediction error distribution 51 follows Gaussian distribution 52. Accordingly, in Eq. (5), the Gaussian distribution $N(0, \sigma_e^2)$ was used as the channel capacity prediction error distribution.

Figure 7:
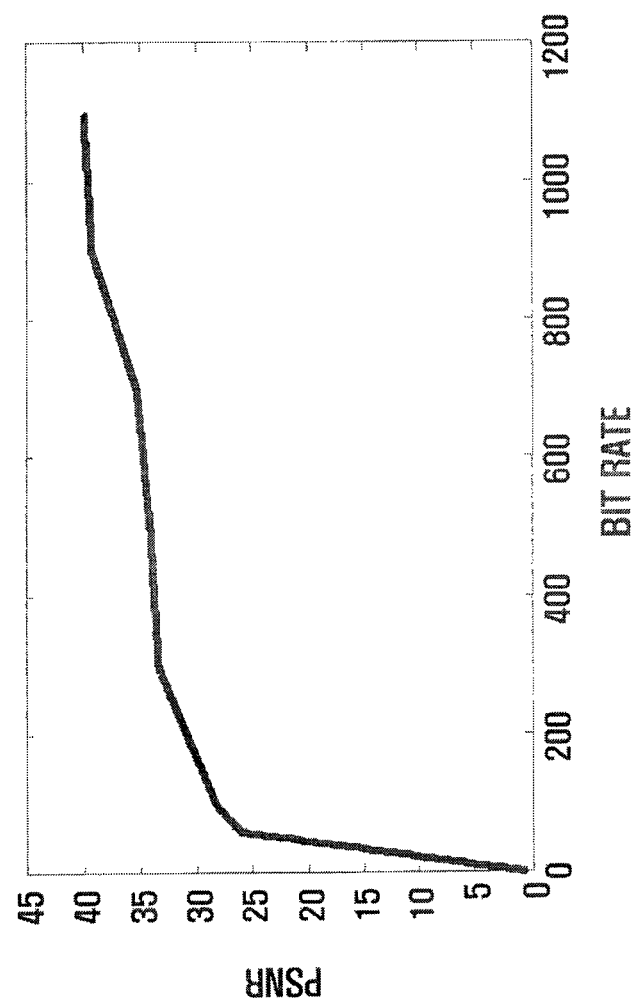
FIG. 7 is a view describing a video RD function applied to the present invention.

FIG. 7 is a view describing a video RD function applied to the present invention, which represents the relation between bit rate and PSNR as standards of the video quality.

As mentioned earlier, the coding rate adjustment method in accordance with the present invention optimally adjusts the video coding rate and the channel coding rate by using the channel capacity prediction error distribution (see FIG. 6) and the video RD function (see FIG. 7).

The following is a description for the fact that the present invention is more excellent than the prior art in terms of performance.

FIGS. 8 to 13 are views describing the comparison of channel capacity predictions relative to variations of physical layer data rate.

Figure 8:
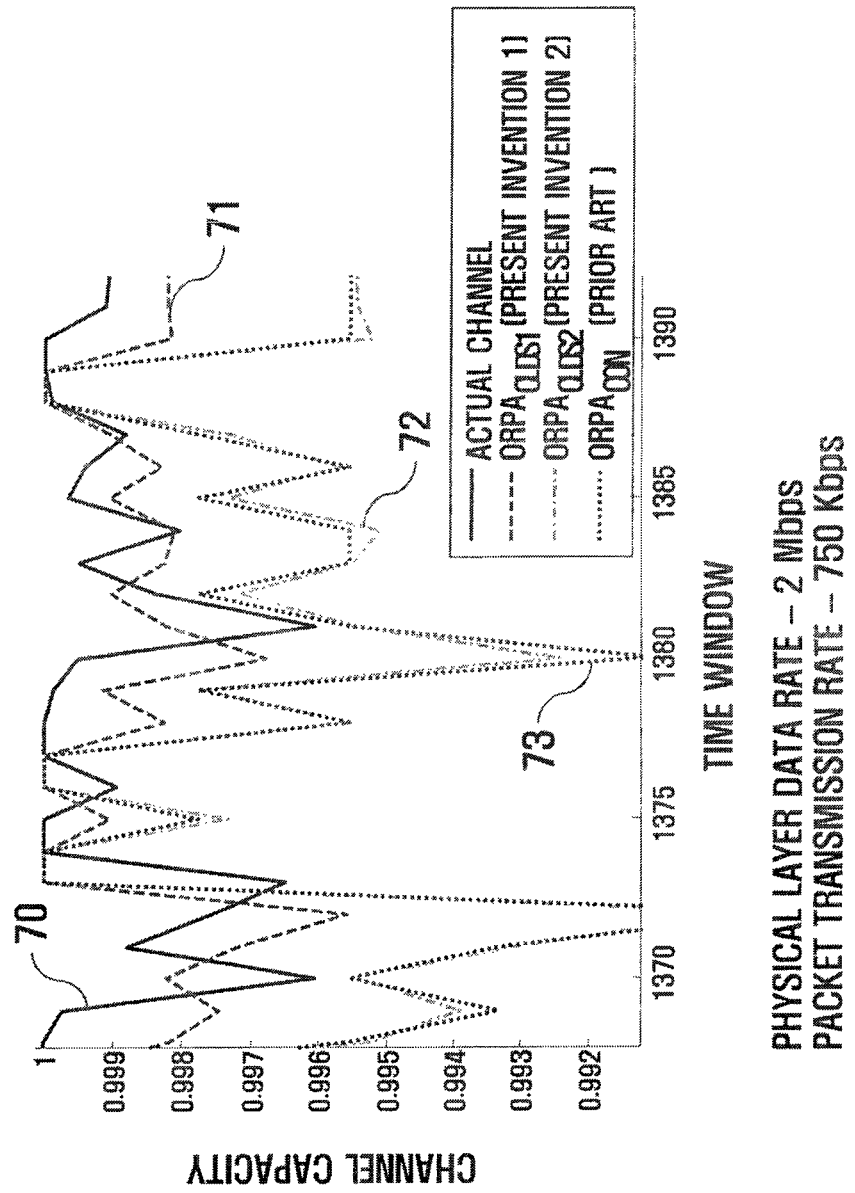
Figure 9:
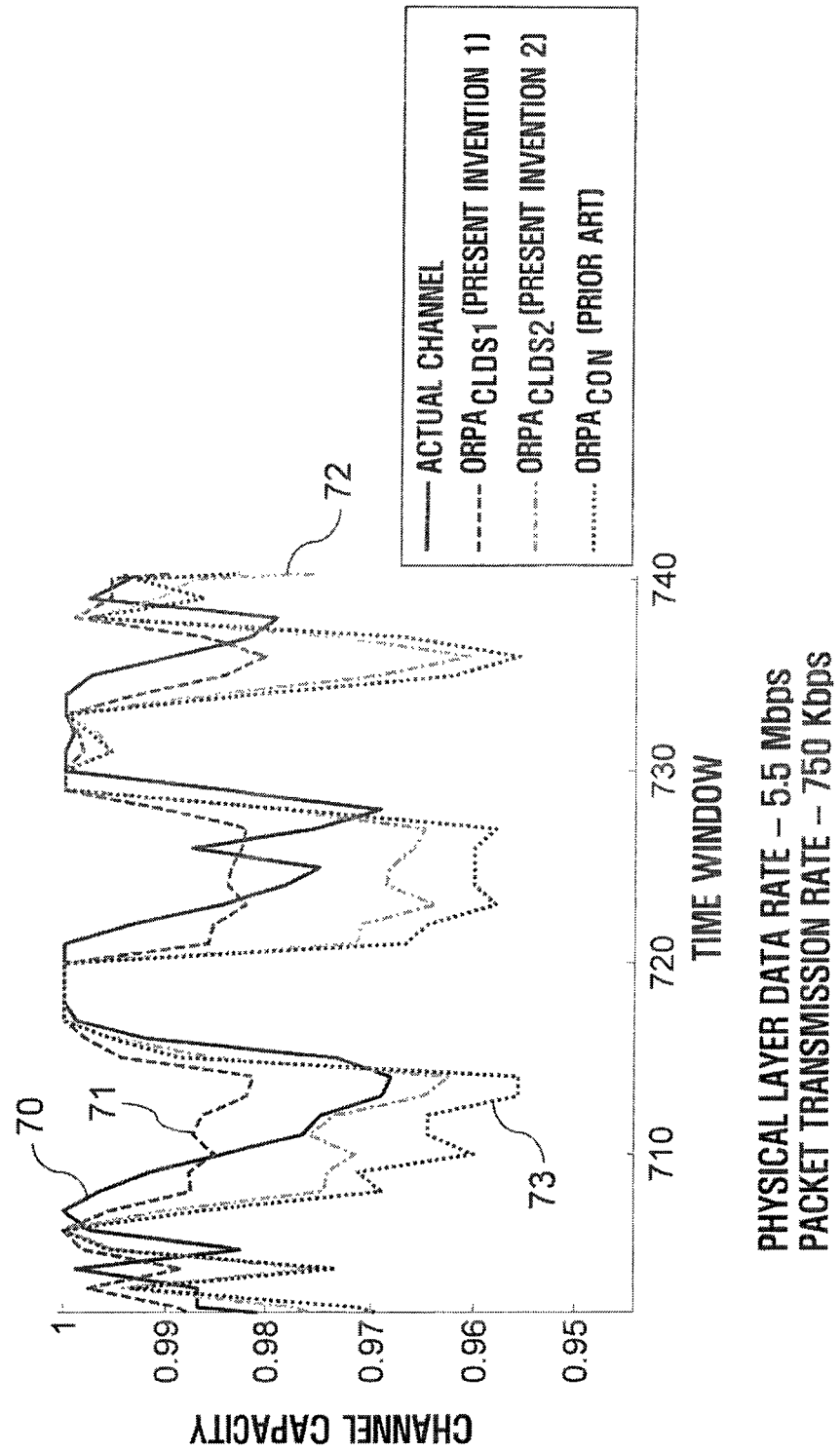
Figure 10:
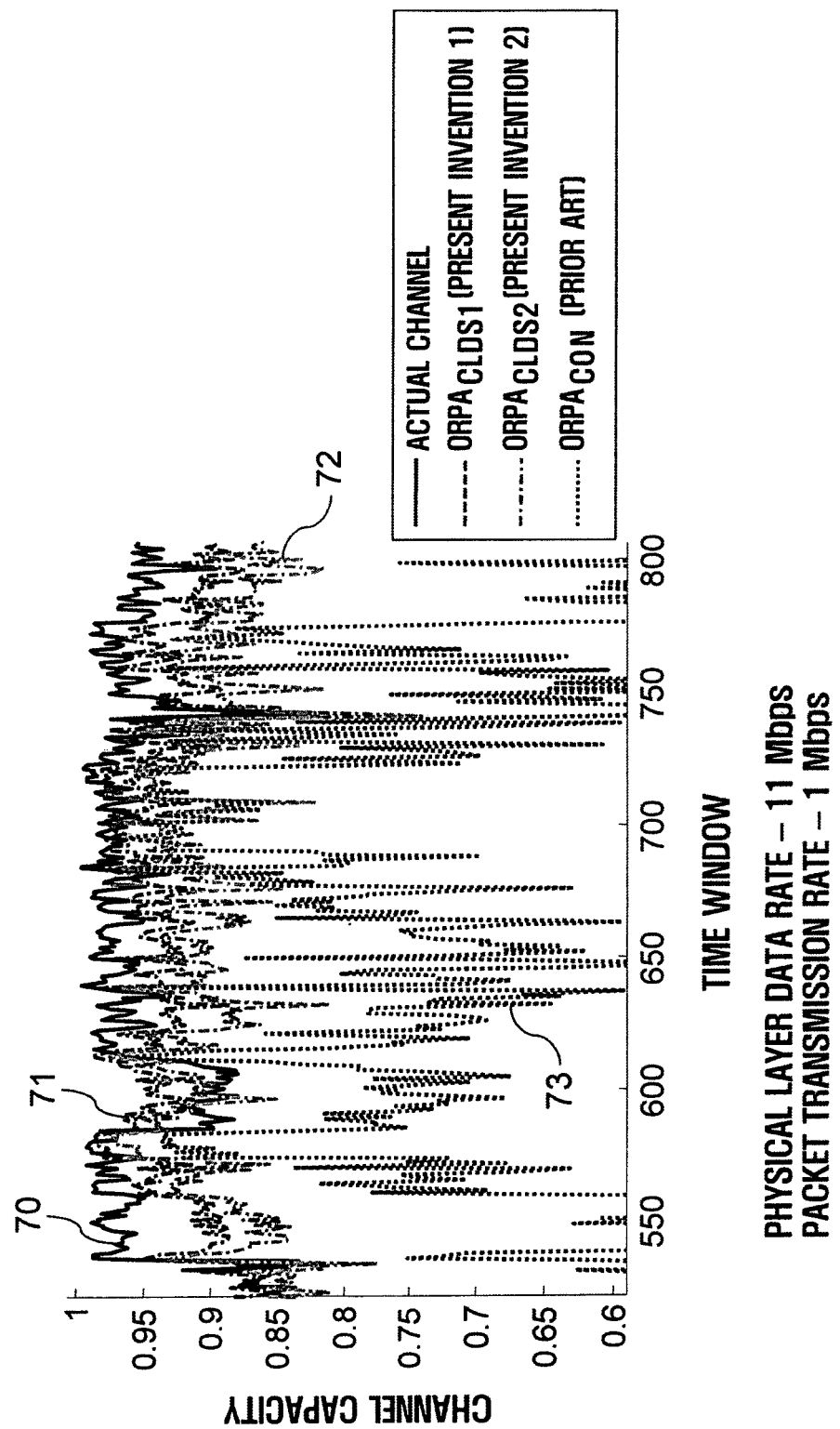
Figure 11:
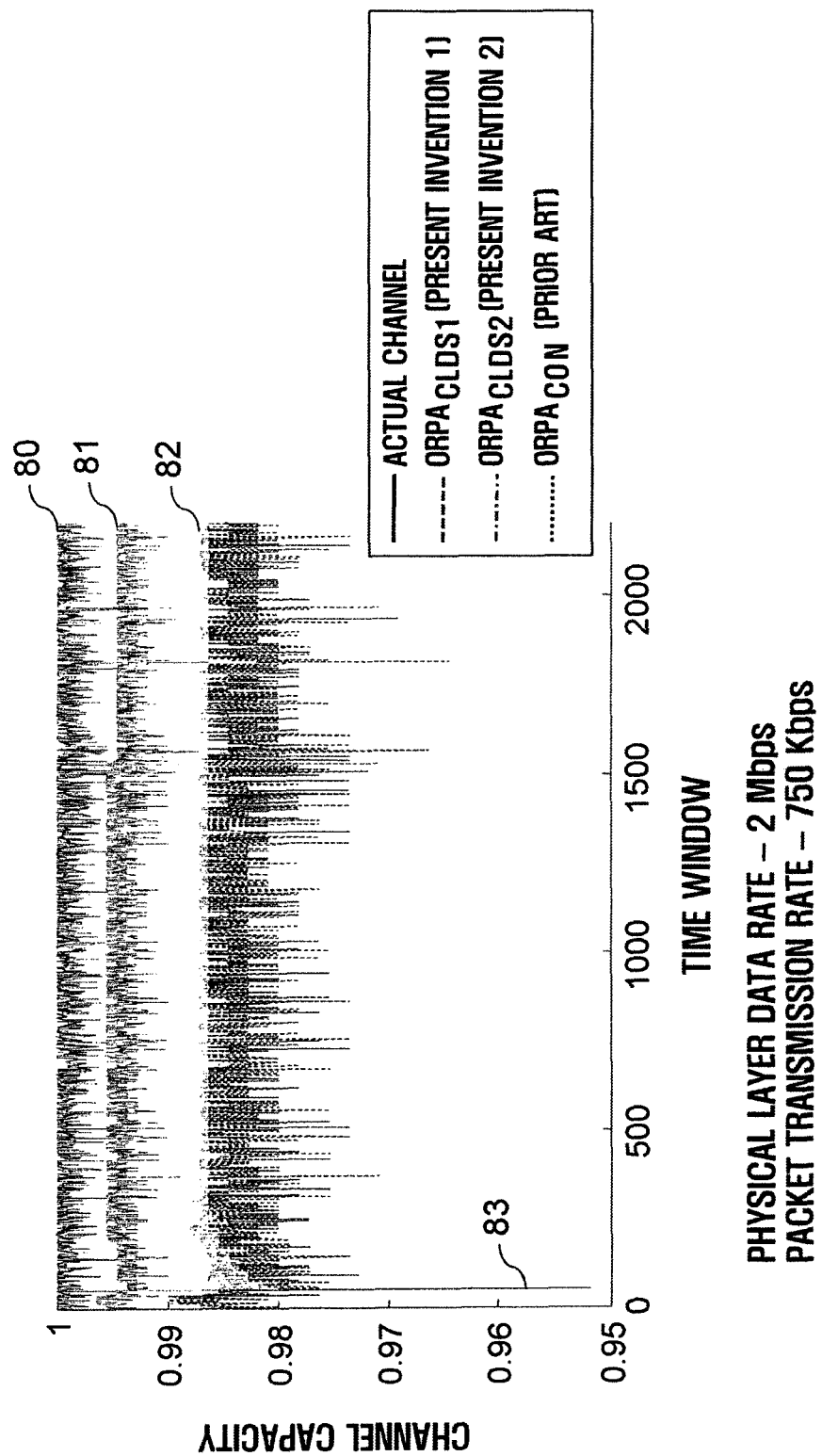
Figure 12:
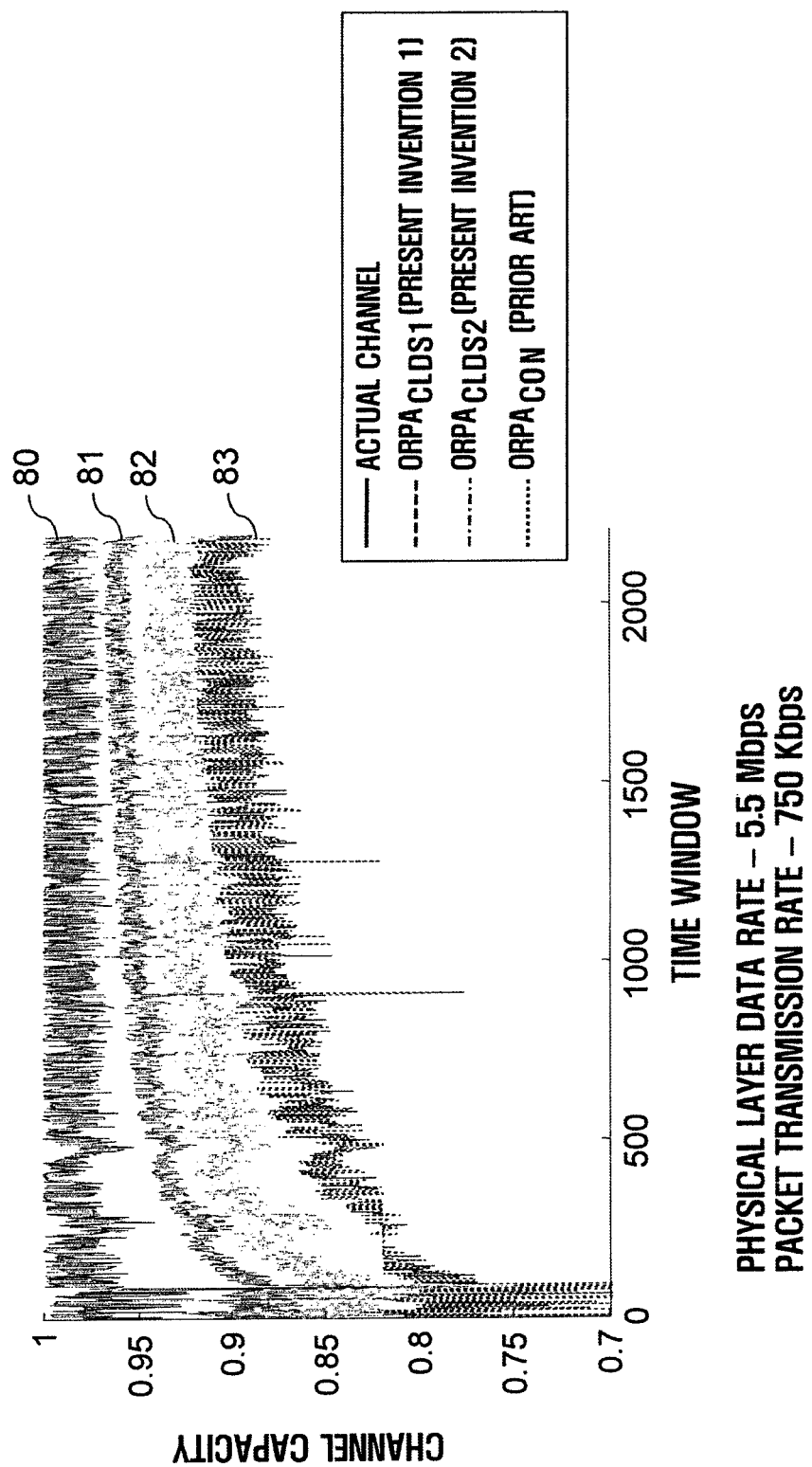

FIGS. 8 and 11 show the channel capacity prediction result when the physical layer data rate is 2 Mbps and the packet transmit rate is 750 Kbps, FIGS. 9 and 12 present the channel capacity prediction result when the physical layer data rate is 5.5 Mbps and the packet transmit rate is 750 Kbps, and FIGS. 10 and 13 show the channel capacity prediction result when the physical layer data rate is 11 Mbps and packet transmit rate is 1 Mbps.

In addition, FIGS. 8 to 10 and 11 to 13 show the comparison results of channel capacity prediction values for each case (simulation condition) among actual channels 70 and 80, the present invention $ORPA_{CLDS1}$ and $ORPA_{CLDS2}$ 71, 72, 81 and 82, and the prior art $ORPA_{CON}$.

Further, FIGS. 8 to 10 show the results before the rate adjustment in accordance with the present invention, and FIGS. 11 to 13 depict the results after the rate adjustment in accordance with the present invention is applied.

From a comparison between a video adaptation/conversion architecture based on CLDS protocol (Optimal Rate Prediction Architecture based on CLDS protocol: $ORPA_{CLDS}$) 71, 72, 81 and 82 according to the present invention and a conventional video adaptation/conversion architecture based on CON protocol ($ORPA_{CON}$) 73 and 83, it can be seen that the performance of the present invention ($ORPA_{CLDS1}$ and $ORPA_{CLD2}$) is superior than that of the prior art ($ORPA_{CON}$) in terms of channel estimation and prediction. That is, it can be found that the present invention remarkably improves the accuracy of channel capacity prediction.

On the other hand, the method of the present invention as mentioned above may be implemented by a software program. Further, the codes and code segments constituting the program can easily be deduced by a computer programmer skilled in the art. Also, the program prepared is stored in a computer-readable recording medium (data storage medium), and read and executed by the computer to implement the present invention. Moreover, the recording medium includes all types of storage medium that can be read by the computer.

As described below, the present invention provides a video adaptation/conversion scheme based on CLDS protocol, and has the effect of having remarkably superior performance than any video adaptation/conversion scheme based "CON protocol" (radio LAN protocol) in terms of channel capacity estimation/prediction and rate adjustment. In addition, the present invention also has the effect of significantly improving the possibility of utilization of CLDS protocol.

In other words, the present invention estimates BER by using side information (channel status side information), and estimates channel capacity based on the estimated BER, thereby greatly improving the accuracy of channel capacity estimation and prediction in radio environments.

Moreover, the present invention adjusts video/channel coding rates on the basis of precise channel estimate, so that robust rate adaptation is possible to ultimately improve the quality of wireless video.

The present application contains subject matter related to Korean Patent Application No. 10-2007-0139188, filed in the Korean Intellectual Property Office on Dec. 27, 2007, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

What is claimed is:

1. A coding rate adjustment method for adaptive video transmission based on a cross-layer design with side information (CLDS) protocol, the method comprising:
   acquiring, by a video reception apparatus, channel status side information from a video stream received through a network from a video transmission apparatus;
   estimating, by the video reception apparatus, a bit error rate (BER) for each video packet of the video stream using the channel status side information;
   estimating, by the video reception apparatus, channel capacity for a current channel cycle based on the estimated BER;
   providing, by the video reception apparatus, the estimated channel capacity to the video transmission apparatus;
   predicting, by the video transmission apparatus, channel capacity for a next channel cycle using the estimated channel capacity that is provided from the video reception apparatus; and
   adjusting, by the video transmission apparatus, a video coding rate and a channel coding rate, to optimize video quality, within a permissible range of the predicted channel capacity by using a channel capacity prediction error distribution and a video rate distortion (RD) function,
   wherein the video coding rate for the next channel cycle is adjusted to have a value that a peak signal to noise ratio(PSNR) of video in transmission can be optimized for the next channel cycle, and
   wherein the video coding rate plus the channel coding rate is equal to 1.

2. The method of claim 1, wherein the channel status side information is either a Signal to Silence Ratio (SSR) or a checksum.

3. The method of claim 1, wherein the estimating of the channel capacity includes:
   calculating an entropy for the estimated BER;
   calculating an average value of entropies for the current channel cycle; and
   estimating the channel capacity using the average value of entropies.

4. The method of claim 1, wherein the estimating of the channel capacity includes:
   obtaining an average value of estimated BERs for the current channel cycle;
   calculating an entropy for the average value of estimated BERs; and
   estimating the channel capacity based on the entropy.

5. The method of claim 1, wherein the channel capacity prediction error distribution approximates a Gaussian distribution.

6. The method of claim 1, wherein the RD function represents a relationship between a bit rate and a peak signal to noise ratio (PSNR).

7. A video service system for adaptive video transmission based on a cross-layer design with side information (CLDS) protocol, the system comprising:
   a video transmission apparatus; and
   a video reception apparatus,
   wherein the video reception apparatus comprises:
   a channel capacity estimator configured to estimate a Bit Error Rate (BER) of each video packet of a video stream by using channel status side information acquired from the video stream, estimate channel capacity for a current channel cycle based on the estimated BER, and provide the estimated channel capacity to the video transmission apparatus, and
   wherein the video transmission apparatus comprises:
   a coding rate adjustor configured to predict channel capacity for a next channel cycle using the estimated channel capacity that is provided from the video reception apparatus, and adjust a video coding rate and a channel coding rate, to optimize video quality, within a permissible range of the predicted channel capacity by using a channel capacity prediction error distribution and a video rate distortion (RD) function,
   wherein the video coding rate for the next channel cycle is adjusted to have a value that a peak signal to noise ratio(PSNR) of video in transmission can be optimized for the next channel cycle, and
   wherein the video coding rate plus the channel coding rate is equal to 1.

8. The system of claim 7, wherein the channel capacity estimator is configured to calculate an entropy for the estimated BER, calculate an average value of entropies for the current channel cycle, and estimate the channel capacity based on the average value of entropies.

9. The system of claim 7, wherein the channel capacity estimator is configured to calculate an average value of estimated BERs for the current channel cycle, calculate an entropy for the average value of BERs, and estimate the channel capacity based on the entropy.

10. The system of claim 7, wherein the RD function represents a relationship between a bit rate and a peak signal to noise ratio (PSNR).

11. The system of claim 7, wherein the channel status side information is either a Signal to Silence Ratio (SSR) or a checksum.

12. The system of claim 7, wherein the channel capacity prediction error distribution approximates a Gaussian distribution.

13. The system of claim 7, wherein the video reception apparatus further comprises a decoding unit configured to channel-decode the video stream based on the channel status side information and video-decode the channel-decoded video stream to recover an original video stream.

14. The system of claim 7, wherein the video transmission apparatus further comprises an encoding unit configured to perform video and channel encoding based on the adjusted video and channel coding rates to generate a next video stream.

* * * * *